Patented Jan. 16, 1923.

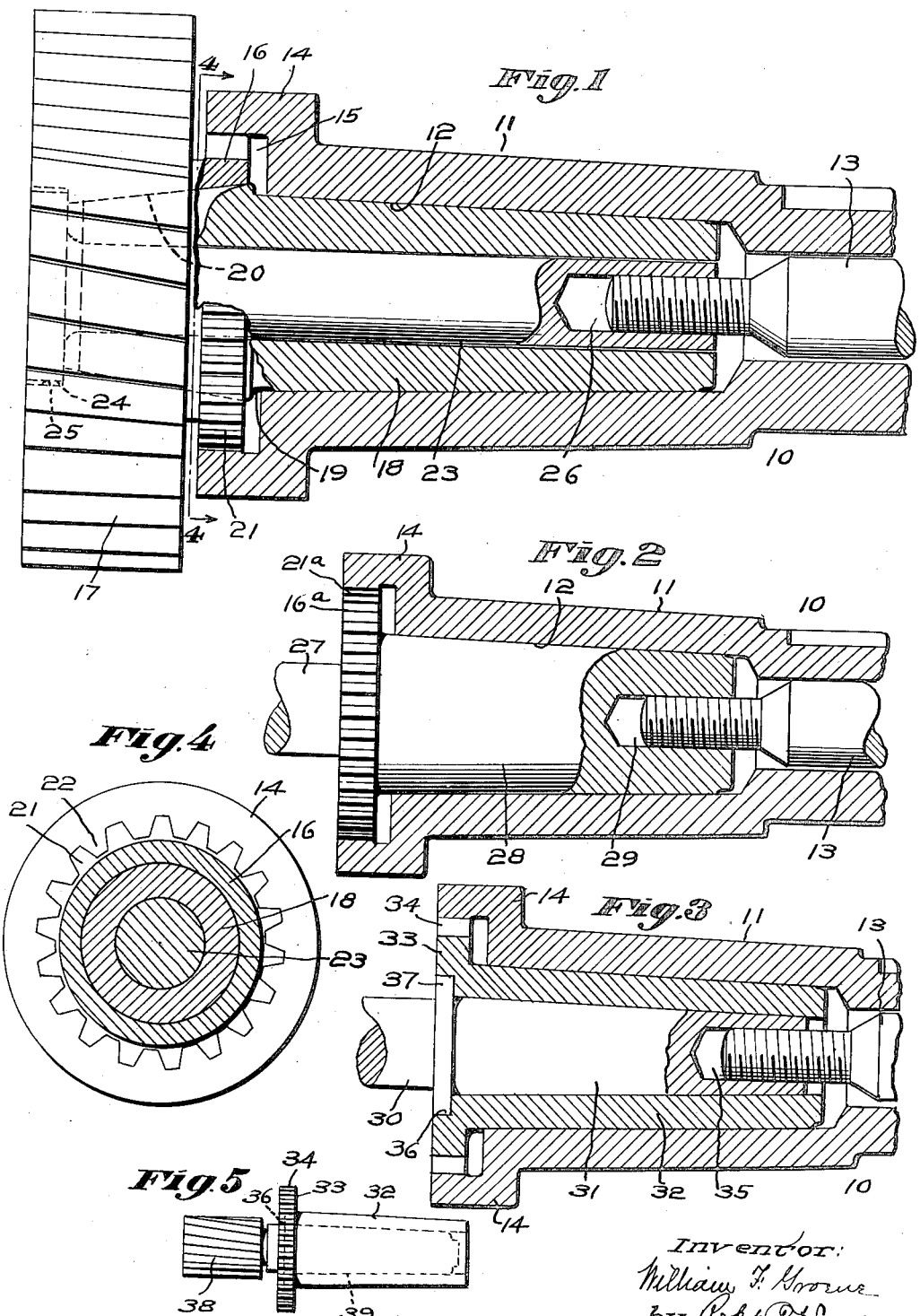

1,442,659

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

MILLING-MACHINE SPINDLE.

Application filed June 10, 1920. Serial No. 387,903.

*To all whom it may concern:*

Be it known that I, WILLIAM F. GROENE, a citizen of the United States, residing at Cincinnati, county of Hamilton, and State of Ohio, have invented an Improvement in Milling-Machine Spindles, of which the following description, in connection with the accompanying drawings, is a specification, like characters on the drawings representing like parts.

The invention to be hereinafter described relates to milling machine spindles and more particularly to the means for forming a positive driving connection between a driving spindle and the tool carried thereby.

In milling machines, and in various other machines of the type in which a tool is driven from a rotating spindle, it is desirable to provide means by which the tool may be readily secured to and removed from the spindle, while at the same time, it is important that the tool be rigidly secured to the spindle to prevent relative movement between the spindle and tool during the operation of the spindle.

Various devices have been proposed heretofore for removably securing arbors and cutters to driving spindles, and these devices have proven more or less satisfactory where the driving torque exerted upon the tool by the spindle is not very great, but when a large cutter or other tool is driven under heavy load, difficulty has been experienced heretofore in preventing relative movement between the spindle and cutter. Furthermore, the means proposed heretofore for providing a positive driving connection between large tools and the driving spindle have been more or less complicated so that considerable time was expended in securing a cutter to and removing it from the spindle.

An important feature of the present invention, therefore, is to provide simple but satisfactory means by which a cutter or tool support may be positively driven from a driving spindle, while at the same time the cutter or tool support may be easily and quickly secured to and removed from the spindle. The accompanying drawing illustrates a good, practical form of the invention, the details of which may be modified within the scope thereof, as defined by the claims.

In the drawing:—

Figure 1 is a fragmentary, longitudinal sectional view of a driving spindle having a large face mill secured thereto, in accordance with the invention;

Fig. 2 is a similar view of the driving spindle on a smaller scale, showing an arbor secured to the driving spindle in accordance with the invention;

Fig. 3 is a view similar to Fig. 2, but showing an arbor secured to the driving spindle by means of a collet mounted in the spindle and connected thereto, in accordance with the invention;

Fig. 4 is a sectional view taken on the line 4—4 of Fig. 1; and

Fig. 5, on a reduced scale, shows an ordinary end mill secured in the collet of Fig. 3.

Referring to the drawing, 10 designates the hollow driving spindle of a milling machine which, with the exception of its tool supporting end, may be of usual or any preferred construction. This spindle is shown as having the usual tapered bearing 11, the inner tapered bore 12 and the usual bolt 13 extending into the tapered portion of the spindle from the rear end of the spindle.

In the embodiment of the invention illustrated, the spindle 10 is shown as having its forward end enlarged as indicated by 14, and within this enlargement is formed a socket 15 concentric with the tapered bore 12. This socket is constructed to receive a shoulder or projection 16 formed on the tool or tool support to be driven from the spindle, and to prevent relative rotation between the spindle and tool or tool support, the socket 15 and shoulder 16 are given a configuration such that when the shoulder is inserted within the socket, rotation therebetween is positively prevented.

Relative rotation between the socket 15 and shoulder 16 may be prevented by providing the surfaces of the same with variously formed interengaging parts, and these intergaging parts preferably should be formed at relatively close intervals, in order that the shoulder will receive an even and well balanced drive upon all parts of the periphery of the same. The interengaging or meshing parts of the shoulder and socket should be symmetrically constructed so that in assembling, it will be necessary to rotate the shoulder through only a small angle to align the interengaging parts of the shoulder and socket.

In the embodiment of the invention illustrated, the positive driving connection between the tool or tool-support and driving spindle, consists in forming an internal gear within the nose or front end of the spindle 10, the teeth of which mesh with teeth formed upon the periphery of the shoulder 16, as clearly shown in Fig. 4. These teeth obviously may be given any preferred configuration so long as they prevent relative rotation between the spindle 10 and shoulder 16, and if desired, may be formed on different surfaces of the spindle and shoulder.

As is well known, it is customary to secure different types of cutters to driving spindles by different means. For example, circular saws and wheel cutters are usually mounted upon an arbor which in turn is secured to the driving spindle, while face cutters are commonly mounted on a different type of arbor, and end mills are commonly provided with an integral tapered shank that may be driven into the tapered bore of the spindle, or into a collet which in turn, is driven into the spindle. In order to show the application of the present invention to these different types of cutters, the several views of the drawing which will now be more fully described, have been shown.

In Fig. 1, a relatively large face cutter 17 is shown as mounted upon a face cutter arbor 18, having a tapered shank 19 which fits in the tapered bore 12 of the driving spindle, and this arbor is provided with a second tapered portion 20 adapted to receive a correspondingly-shaped opening formed centrally through the face cutter. To provide a direct positive driving connection between the cutter 17 and spindle 10, the cutter is provided with the shoulder 16, above-mentioned, the teeth 21 of which mesh with the teeth 22 formed within the socket 15, as clearly shown in Figs. 1 and 4. The cutter 17 is held upon the arbor 18 and this arbor is held in place within the spindle 10 by a bolt 23, the head 24 of which is received in a recess 25 in the face of the cutter, while the inner end of this bolt has a threaded socket 26 adapted to receive the threaded end of the bolt 13 in a well-known manner.

In Fig. 2 the spindle 10 is shown as having a cutter arbor 27 of the type used to drive wheel cutters and the like, secured therein. This arbor 27 has a tapered shank 28 adapted to fit the tapered bore 12, and the inner end of the shank 28 may have a threaded bore 29 to receive the threaded end of the bolt 13. The arbor 27 is provided with a shoulder or projection 16ª having teeth 21ª constructed to mesh with the teeth 22 of the spindle 10.

In Fig. 3, the spindle 10 is shown as having an arbor 30 mounted therein, the shank 31 of which is too small to fit the tapered bore 12, and a collet 32 is shown as taking up the space between the shank 31 and the bore 12. The collet 32 is provided with a toothed shoulder 33 similar to the shoulder 16ª upon the arbor 27, the teeth 34 of which mesh with the teeth 22 of the spindle 10. The shank 31 may have a threaded socket 35 receiving the threaded end of the bolt 13, and the forward end of the collet 32 is preferably provided with a socket 36 constructed to non-rotatably receive a key or flange 37 upon the arbor 30. In Fig. 5 the collet 32 is shown as removed from the spindle 10 and has mounted therein an end mill 38 provided with the usual tapered shank 39 fitting the tapered bore of the collet.

From the foregoing description when read in connection with the drawing, it will be seen that the present invention presents a very satisfactory connection between a driving spindle and a tool or tool-support for positively driving the tool or tool-support from the spindle, and it will also be apparent that the interengaging surfaces formed upon the spindle and tool or tool-support to prevent relative rotation therebetween, may be variously constructed without departing from the scope of the invention as defined by the claims.

What is claimed is:—

1. In a device of the character described, in combination, a driving spindle having a bore formed longitudinally therein and having a socket formed in the tool-supporting end of the spindle about the bore, a tool-support having a shank fitting said bore, a cutter carried by the tool-support, a shoulder surrounding the tool support at one side of the cutter and rigid with one of them, and a multiplicity of protruding interengaging surfaces upon the shoulder and within said socket forming a positive driving connection between the spindle and shoulder.

2. In a device of the character described, in combination, a driving spindle provided with a tapered bore and having an internal gear formed in the nose of the spindle about the bore, a tool-support having a tapered shank fitting said bore, a cutting tool carried by the tool-support, a shoulder surrounding the tool-support and having a multiplicity of gear teeth meshing with the gear teeth of the spindle and forming a positive driving connection between the spindle and shoulder.

3. In a milling machine, the combination of a driving spindle having a tapered bore formed longitudinally therein and having a socket formed in the tool-supporting end of the spindle about the bore, a tool-support having a tapered shank fitting said bore, a mill cutter carried by the tool-support, a shoulder surrounding the tool-support and adapted to enter said socket, and a multiplicity of interengaging projections on said shoulder and in said socket forming a positive driving connection between the spindle and shoulder.

4. In a milling machine, a driving spindle having a smooth tapered bore formed centrally within an end thereof, a nose upon said end of the spindle and having a socket formed therein concentric with the bore, and an internal gear within the socket formed of teeth extending inwardly from the wall of the socket and adapted to mesh with teeth surrounding a tool-support insertable in said bore.

5. In a milling machine, the combination of a driving spindle provided with a tapered bore formed centrally within an end of the spindle and having a socket formed in the nose of the spindle concentric with the bore, a face cutter provided with a tapered shank fitting said bore, an annular projection rigid upon the rear face of the cutter and surrounded by teeth extending outwardly from the projection, and teeth formed within said socket to extend inwardly from the wall thereof and adapted to mesh with the teeth of the face cutter and to positively drive the face cutter when its shank is inserted in said bore.

6. In a milling machine, the combination of a driving spindle provided with a smooth tapered bore formed centrally within an end of the spindle and having a socket formed in the nose of the spindle concentric with the bore, a tool-support having a smooth tapered shank adapted to fit said bore, a cutter removably secured to the tool-support and having a shoulder adapted to enter said socket, and protruding interengaging surfaces upon said shoulder and within said socket forming a positive driving connection between the cutter and driving spindle.

7. In a milling machine, the combination of a driving spindle provided with a shank-receiving bore and having a socket formed in the nose of the spindle concentric with the bore, a cutter provided with a shoulder extending into said socket and with a shank extending into said bore, and protruding interengaging surfaces upon said shoulder and spindle forming a positive driving connection between the cutter and spindle.

In testimony whereof, I have signed my name to this specification.

WILLIAM F. GROENE.